Feb. 5, 1974     E. PITCHON ET AL     3,790,689

EXTRACTION OF ROASTED AND GROUND COFFEE

Filed April 24, 1972

United States Patent Office 3,790,689
Patented Feb. 5, 1974

3,790,689
EXTRACTION OF ROASTED AND GROUND COFFEE
Esra Pitchon, Flushing, and Ernest L. Earle, Jr., New York City, N.Y., assignors to General Foods Corporation, White Plains, N.Y.
Filed Apr. 24, 1972, Ser. No. 246,955
Int. Cl. A23f 1/08
U.S. Cl. 426—434          28 Claims

ABSTRACT OF THE DISCLOSURE

In a process for split-extraction percolation of roasted and ground coffee it has been discovered that by rapidly draining, or blowing out the extraction liquor from the fresh stage extraction column, a coffee extract of improved quality is obtained. Also, it has been discovered that if the secondary extract from the autoclave section is contacted with fresh-roasted and ground coffee, the quality of the secondary extract is upgraded. The preceding steps in combination is a preferred method of practicing split-extraction percolation.

BACKGROUND OF THE INVENTION

Figure 1:
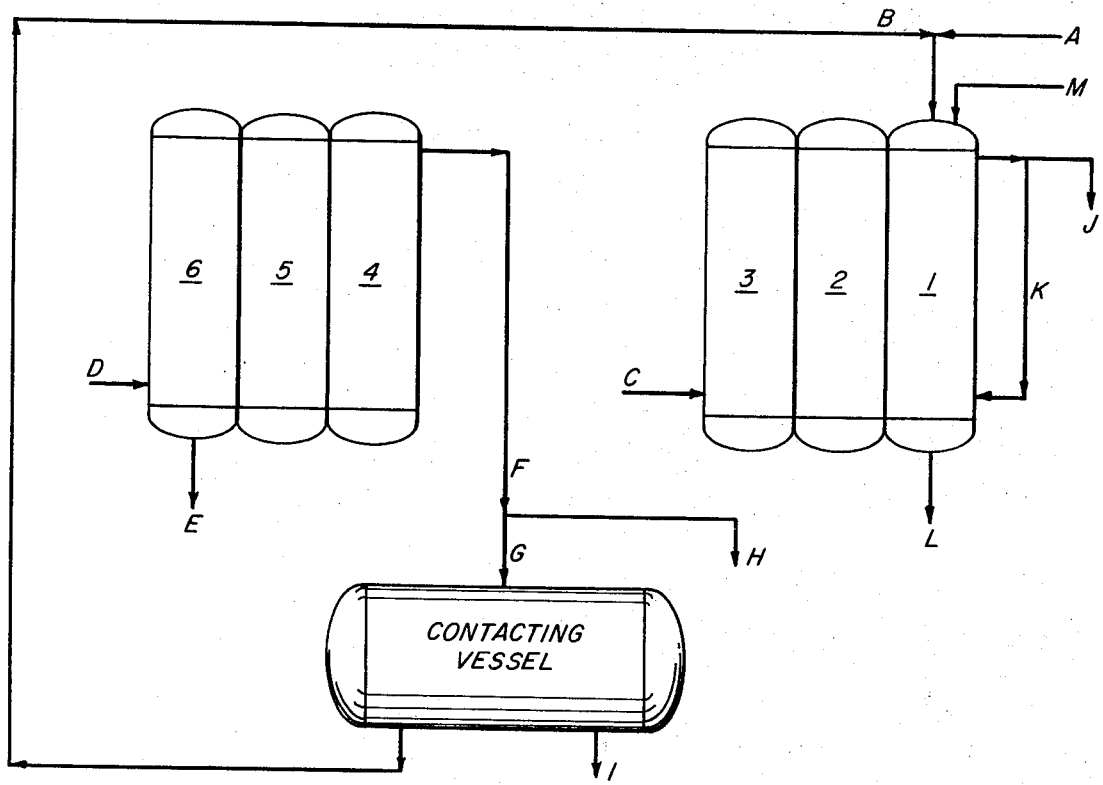

This invention concerns the extraction of roasted and ground coffee, as a method of obtaining a coffee extract which is suitable for further processing via standard techniques such as spray-drying or freeze-drying. More particularly, the invention concerns modifications of a percolation technique known as split-extraction percolation.

As used in this invention percolation is intended to denote the extraction of soluble coffee solids from roasted and ground coffee in a percolator set. A percolator set is a series of extraction columns (typically 5-8 columns) connected with suitable manifolding to permit the passage of an extraction liquor through the extraction columns, wherein roasted and ground coffee is contacted and extracted by the extraction liquor. Percolation in a percolator set is a batch-continuous operation. The extraction liquor is continuously pumped through the percolator set by feeding heated extraction liquor into one end of the extraction column containing the most extracted roasted and ground coffee (this column is normally referred to as the spent stage). The extraction liquor passes through successive extraction columns and finally is fed into the extraction column containing the freshly charged roasted and ground coffees (this extraction column is normally referred to as the fresh stage). A predetermined quantity of extraction liquor is drawn off from the fresh stage. The draw-off, normally referred to as extract, is an aqueous solution of soluble coffee solids extracted in the percolator set. In a typical percolation process, while the extract is being drawn off from the fresh stage, the feed of extraction liquor is transferred to the extraction column containing what was the next most spent roasted and ground coffee. The roasted and ground coffee in the spent stage is then blown out and the extraction column is prepared with a fresh charge of roasted and ground coffee for the next cycle in the percolation operation. At the completion of the draw the extraction liquor is then fed into the freshly prepared extraction column and this column becomes the new fresh stage. A percolation cycle is the period of time elapsing from the completion of one draw-off to the completion of the next draw-off. In this manner the extraction liquor is continually passed through the percoator set in the direction countercurrent to the flow of fresh roasted and ground coffee. The roasted and ground coffee passes through the percolator set as batches, or extraction column loads. Thus, in ordinary percolation there is one extraction liquor feed stream and one extract draw-off stream.

In split extraction percolation there are two extraction liquor feed streams and two draw-off streams. The percolator set can be visualized as being divided into two sections. In the first section, the fresh stage section which may consist of from 1 to 4 extraction columns, the fresh coffee is being extracted under gentle conditions by an extraction liquor which can be referred to as an aqueous fresh stage extraction liquor. Extract is drawn off from the fresh stage as in ordinary percolation and this extract is referred to as the fresh stage extract. The roasted and ground coffee is still passed through the percolation set in batches as in ordinary percolation. However, the partially extracted coffee leaving the fresh stage section of the percolator set is then subjected to additional extraction with a second extraction liquor in the more spent stages of the percolation set, commonly referred to as the autoclave section. A second draw-off of coffee extract is collected from the extraction column containing the least extracted coffee in the autoclave section which can be referred to as a secondary extract. The temperatures and pressures in the autoclave section are significantly higher than in the fresh stage section and the solids in the secondary extract are essentially autoclaved solids and those atmospherically soluble solids not extracted in the fresh stage section of the percolator set. The fresh stage extract contains essentially atmospherically soluble coffee solids. Thus, in split-extraction percolation there are two feed streams of extraction liquors and two extract draw-offs for each cycle. The extracts can be combined prior to further processing or the extract streams can be processed separately and the powders produced therefrom can be combined or packaged separately.

As used in this invention, roasted and ground coffee refers to any combination of roasted coffee which has been prepared by roasting separate varieties of coffee or blends of green coffee, or wherein varieties of coffee are separately roasted and ground and then combined, or wherein separate varieties of coffee are treated from the inception or roasting through percolation. Also, the term roasted and ground coffee is equally applicable to either a decaffeinated or caffeinated coffee.

Split-extraction percolation has been used as a means of improving upon ordinary percolation in order to produce an upgraded coffee extract. However, it has been found that even using ordinary split-extraction percolation, the quality of the coffee needs further upgrading, in order to compare more favorably with a fresh brewed cup of coffee prepared by the housewife in an ordinary percolator.

SUMMARY OF THE INVENTION

It has been discovered that the quality of extract drawn off from the fresh stage of a percolator set being operated as a split-extraction percolator set can be improved by minimizing the heat treatment of the roasted and ground coffee in the fresh stage extraction column and more uniformly treating the fresh roasted and ground coffee in the fresh stage extraction column. Thus, it has been found that if the fresh stage extraction liquor is permitted to fill the fresh stage extraction column and is then immediately drained from this column, the coffee extract thus drained from the column has improved quality as compared to fresh stage coffee extract normally drawn off in a split extraction process. As a means of speeding up the draining of the extract from the fresh stage extraction column it is preferred to use a positive pressure of an inert gas to actually blow the liquor out of the fresh stage extraction column. The inert gas can be nitrogen, carbon-dioxide or any other inert gas which will not tend to impart off flavors to coffee extract. As a means of increasing the concentration of solids in the extract being blown out of the fresh stage extraction column, it may be desirable to recirculate the extraction liquor through the fresh stage for a period of up to 20 minutes prior to draining the liquor out of the fresh stage extraction column. The number of extraction columns in the fresh stage section of the percolator set being exposed to the passage of the fresh stage extraction liquor can vary from 1 to 4 extraction columns. When using the technique of recirculating the fresh stage extraction liquor around the fresh extraction column, it may be desirable to limit the number of extraction columns in the fresh stage section to 1 column. When recirculation is not being utilized it is preferred to have at least 2 and more preferably 3 extraction columns comprising the fresh stage section of the split-extraction percolation set. It is considered important to limit the temperature of the extraction liquor going through the fresh stage extraction column to a maximum of 210 degrees Fahrenheit and generally the extraction liquor will be controlled at a temperature of 70 degrees Fahrenheit to 210 degrees Fahrenheit.

It has also been discovered that the quality of the secondary extract being drawn off from the autoclave section of the percolation set, e.g., the last several extraction columns in the percolator set containing the most extracted roasted ground coffee, can be upgraded by intimately contacting the secondary extract drawn-off with fresh roasted and ground coffee, or with roasted and ground coffee which has been partially extracted in the fresh stage extraction column. As used in this specification, contacting the secondary extract with roasted and ground coffee, either fresh roasted and ground coffee or partially extracted roasted and ground coffee, means intimately mixing the secondary extract with a roasted or ground coffee in a vessel. The vessel can be an extraction column wherein the secondary extract is passed through the extraction column thus contacting the roasted ground coffee therein. As soon as all of the secondary extract has been pumped into the extraction column, the extract remaining within the column is drained and separated from the roasted and ground coffee and mixed with the secondary extract that has been drawn off as the secondary extract was being pumped into the column. The column containing the roasted and ground coffee is then further processed. Thus, if fresh roasted and ground coffee was used as the coffee for contacting the secondary extract, the coffee within the extraction column would then be used as the fresh stage roasted and ground coffee for extraction. If the coffee within the extraction column was the roasted and ground coffee which had already been extracted in the fresh stage, it would be used in the next freshest stage in the percolation set. The vessel in which the secondary extract contacts the roasted and ground coffee can also be a slurry tank, e.g., an agitated tank wherein the secondary extract can be intimately mixed and contacted with roasted and ground coffee. The tank would be fitted with means for draining the secondary extract from the roasted and ground coffee so that the roasted and ground coffee can be further processed. It is again essential in this period of contacting the secondary extract with roasted and ground coffee to minimize the temperature for treatment of the coffee and the secondary extract will be cooled to below about 200° F. before it is contacted with the roasted and ground coffee. This particular aspect of the instant invention is found to raise the pH of the secondary extract and generally improve its quality without degrading the roasted and ground coffee with which it is contacted. It has also been found that this aspect of the invention can be practiced while taking the standard draw-off from the fresh stage extraction column of a split-extraction percolation set and still obtain an improved over-all extract quality when the fresh stage extract and the secondary extracts are combined, or when the dry products from these extracts are combined.

In a most preferred embodiment of this invention, the technique of contacting the secondary extract with roasted and ground coffee is combined with the technique of draining the fresh stage extract from the fresh stage extraction column. In this manner the full benefits of the instant invention are realized.

When contacting the secondary extract with freshly roasted and ground coffee which has not been subjected to fresh stage extraction, it is preferred to use from 25% to 60% of the roasted and ground coffee which would normally be utilized as the coffee to fill the fresh stage extraction column for purposes of contacting the secondary extract. The drained roasted and ground coffee would then be combined with the untreated or uncontacted portion of the roasted and ground coffee and charged into the fresh stage extraction column. Where the secondary extract is to be contacted with roasted and ground coffee already subjected to fresh stage extraction, 100% of the fresh stage roasted and ground coffee can be used in the contacting step.

As used in this application, extraction liquor or aqueous extraction liquor refer to water or a water solution of salts or soluble coffee solids.

DETAILED DESCRIPTION OF THE INVENTION

Figure 2:
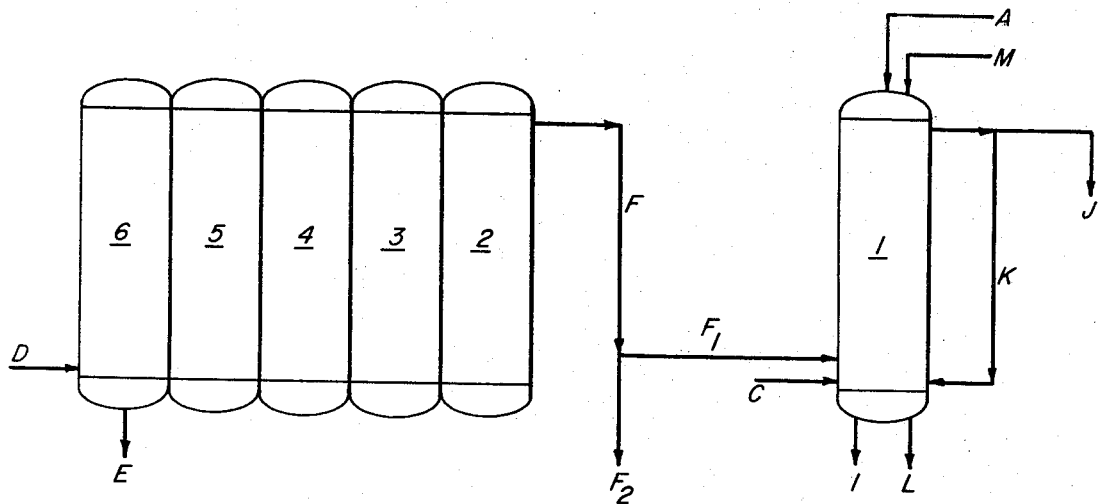

FIGS. 1 and 2 are schematic flowsheets for carrying out the process of this invention.

FIG. 1 shows a percolation set consisting of six extraction columns numbered 6, 5, 4, 3, 2 and 1. The extraction columns are arranged such that columns 1, 2 and 3 comprise the fresh stage section of the split-extraction percolator set and columns 4, 5 and 6 comprise the autoclave section of the percolator set. Fresh roasted and ground coffee A is charged into the fresh stage extraction column 1 and is extracted with the fresh stage aqueous extraction liquor C which is fed into extraction column 3 and passes successively through columns 3, 2 and 1. In one embodiment of this invention when the fresh stage extraction column 1 is filled with liquor, the feed stream C is temporarily discontinued and the fresh stage extract within column 1 is drained as stream L. In a preferred embodiment of this invention an inert gas stream M will be applied to the column under pressure in order to more rapidly force the liquid stream L out of the percolation column. The inert gas to be used is preferably nitrogen or carbon dioxide. The flow of fresh stage extraction liquor is then started up and the extraction liquor will again proceed to fill column 1. At the same time in the autoclave section of the split-extraction percolation set an aqueous extraction liquor D is being fed into extraction column 6 and passed consecutively through columns 6, 5 and 4 and a secondary coffee extract F is being drawn off from column 4. At the completion of the draw-off of a predetermined amount of secondary extract F, the roasted and ground coffee in extraction column 6 (the spent grounds) is discharged as E and the column is cleaned and filled with fresh roasted and ground coffee. The timing of these operations is such that after extraction column 1 has again been refilled with fresh stage aqueous extraction liquor, column 6 may be placed on stream as a new fresh stage extraction column. Column 3 at this point becomes the first extraction column in the autoclave section of the percolator set and the next secondary extract draw-off will be taken from extraction column 3. In this manner, the roasted and ground coffee passes through the percolation set starting as fresh stage coffee and passing progressively through the stage until it becomes the most spent or most extracted roasted and ground coffee and is discharged as stream E. Two aqueous liquor feed streams D and C and two draw-off extract streams F and L are used to countercurrently extract the roasted and round coffee in the two sections of the percolator set.

A second embodiment of the process of this invention calls for drawing off and recycling fresh stage coffee extract as stream K through the fresh stage extraction column 1 for up to 20 minutes prior to draining and collecting the fresh stage coffee extract L. When utilizing this particular aspect of the process of this invention, it is probably desirable to utilize a split-extraction percolation system as depicted in FIG. 2 where the fresh stage section of the percolator set is comprised of a single extraction column 1. In this manner, it will not be necessary to have extraction liquor lying dormant in any extraction column while the extract is being recycled through extraction column 1. Thus, in FIG. 2, the autoclave section of the percolator set consists of extraction columns 2 through 6 and the fresh stage section is comprised of the single extraction column 1.

Another embodiment of this invention calls for contacting the secondary extract stream F with either fresh stage roasted and ground coffee after a fresh stage extract has been drawn off or with freshly roasted and ground coffee which has not been previously extracted. Referring now to FIG. 1, the secondary extract F is shown as taking path G wherein it is passed into a contacting vessel. In the contacting vessel which is generally a slurry tank, the secondary extract is mixed with a portion of the fresh roasted and ground coffee which would normally be charged into the fresh stage extraction column 1. The coffee will be kept in contact with the secondary extract or from one to 20 minutes at a temperature below 210 degrees F. and preferably at a temperature of about 70 to 200 degrees F. and the secondary extract will then be separated from the roasted and gound coffee and exit as secondary treated extract stream I. The roasted and ground coffee from the contacting vessel B will then be combined with uncontacted roasted and ground coffee and the combined streams are charged into the fresh stage extraction column. The contacted coffee stream B will generally be from 25 to 60% of the total charge of roasted and ground coffee being fed into the fresh stage extraction column. Note that the separation of the secondary extract I and the roasted and ground coffee stream B does not have to occur in the contacting vessel. It may be good practice to discharge the slurry material into a separator and draw streams I and B from said separator. Note that in FIG. 1 stream H represents the secondary extract stream where it is drawn off and is not further contacted with fresh roasted and ground coffee. Also note that when practicing this aspect of the instant invention it is possible to draw the fresh stage extract off from column 1 as stream J and not rapidly drain or blow out fresh stage extract L. When secondary extract is to be contacted with the fresh stage coffee after the fresh stage extract has been drawn off it is again preferable to use the arrangement shown in FIG. 2 wherein the fresh stage section consists of only a single extraction column 1. In this instance 100% of the fresh stage roasted and ground coffee can be used to contact the secondary extract. Note that in FIG. 2 the secondary extract stream F is shown as following a path $F_2$ wherein the secondary extract may be collected and not further treated or wherein the stream $F_2$ could follow a path such as G in FIG. 1. Returning to FIG. 2, the path $F_1$ shows the secondary extract passing into and through the fresh stage extraction column. In this instance, the fresh stage extract L or J would have been drawn off and the flow of fresh stage extraction liquor C would be discontinued while the flow of secondary extract $F_1$ was passed into the extraction column. A portion of the secondary extract would be drawn off through path J and separately collected and then combined with the remainder of the secondary extract which would be drained out of the extraction column through path I. While not shown in FIG. 2, it is possible to have two streams such as B and A shown in FIG. 1, also being utilized in the configuration of equipment shown in FIG. 2.

Alternatively, utilizing the split-extraction percolation arrangement of FIG. 2, extraction column 1 could be partially filled with about 25% to 60% of the normal charge of roasted and ground coffee A. The secondary extract stream F could then be contacted with the fresh roasted and ground coffee within column 1 and drained from the column. Following the contacting the remainder of the fresh stage roasted and ground coffee A would be charged into the extraction column 1 and extracted with the fresh stage aqueous extraction liquor C. When practicing this alternative, it is preferable to have a holding tank into which the secondary extract F can be collected and from which it may be pumped through extraction column 1.

In the most preferred embodiment of the instant invention the quick drainage of fresh stage extract from the fresh stage extraction column and the contacting of the secondary extract, with fresh roasted and ground coffee will be combined. Thus, in FIG. 1 the secondary extract F may be treated as stream G in a contacting vessel and then stream B, the contacted roasted and ground coffee, will be combined with unextracted roasted and ground coffee A and charged into the fresh stage extraction column 1. The fresh stage extract will be drained from the extraction column 1 or rapidly blown out of the fresh stage extraction column by an inert gas M. In FIG. 2 the secondary extract F would be conveniently contacted using the fresh stage extraction column as the contcating vessel and contacting the secondary extract with roasted and ground coffee which has already been partially extracted in the fresh stage extraction column.

In carrying out the process of this invention, it may be desirable to concentrate the secondary extract stream. Thus, the secondary extract system may be passed through an evaporative concentrator or any other suitable means for evaporating water and increasing the solids concentration in the secondary extract. Where the secondary extract stream is to be contacted in a vessel with roasted and ground coffee, as a means of increasing the pH of the secondary extract, the concentration step can be carried out either before or after the contacting step.

In practicing the process of this invention, the autoclave aqueous extraction medium will be heated to a temperature of from about 250 degrees F. to 400 degrees F. prior to feeding it into the spent stage extraction column. The fresh stage aqueous extraction medium will be at a temperature of from 70 to 210 degrees F. and both in the fresh stage extract and the secondary extract will generally be cooled to below 100 degrees F. to preserve the extract quality prior to further processing. The two extract streams can be combined and spray-dried via ordinary spray-drying techniques. Alternatively, the two extract streams can be separately dried and the dried powders can be blended after drying. In practicing the alternative procedure of separate drying, it may be desirable to freeze and freeze-dry the fresh stage extract while spray-drying the secondary extract. Alternatively, it may be desirable to concentrate the secondary extract, combine the concentrated extract with the fresh stage extract and freeze-dry the combined extracts. Generally, the powder will be dried until the moisture content of from 1 to 4% by weight of the dry powder. When freeze-drying the coffee extract it may be desirable to dry the coffee to a moisture content of from 1 to 2½% moisture by weight of the dry powder.

The process of this invention will be further described by reference to the following examples:

Example I

A percolator set consisting of 6 extraction columns connected by appropriate manifolding to permit split-extraction percolation was utilized with one extraction column as the fresh stage section and five extraction columns for the autoclave section of the percolator set.

Fresh roasted and ground coffee was charged into the fresh stage extraction column and the column was filled with water at 200° F. $N_2$ gas at a pressure of 100 p.s.i.g. was applied to the top of the fresh stage extraction column and the extract within the column was quickly blown out of the bottom of the column through a strainer which retained the roasted and ground coffee. The fresh stage extract blown out was collected and had a solids concentration of about 10% (weight of coffee solids in the extract) and represented a yield (amount of solids in extract to weight of roasted and ground coffee in the column expressed as a percentage) of about 10%.

Water at a temperature of 350° F. was used as the autoclave aqueous extraction medium and was fed into the spent stage extraction column and passed successively through the five columns of the autoclave section. A secondary extract was drawn off with a solids concentration of about 20% and representing a yield of about 26% such that overall yield was 36%.

The fresh stage extract and the secondary extract were cooled to 70° F. after draw-off. Quality of the fresh stage coffee extract was considered excellent. The secondary extract had a harsh quality, but the combined extracts were considered superior in quality to that obtained in ordinary percolation or ordinary split-extraction percolation.

Example 2

The process of Example 1 was repeated. However, in the fresh stage extraction column, the extraction liquor was recycled through the column for 15 minutes prior to blowing out the fresh stage coffee extract. The concentration of the fresh stage extract was increased to about 15% solids by weight of the extract and represented a yield of about 12%. The draw-off weight of the secondary extract was adjusted to obtain the same overall yield as in Example 1. Quality of the fresh stage extract was similar to that of Example 1 and had the advantage of higher concentration and yield.

Example 3

The process of Example 1 was repeated. However, the secondary extract at a temperature of 200° F. was passed through the fresh stage extraction column as a means of contacting the fresh stage coffee additionally with the secondary extract. This technique resulted in increasing the concentration of the secondary extract to about 23% solids. The extract quality compared favorably to that in Example 1 and did not have the harshness attributed to the secondary extract of Example 1.

Example 4

The process of Example 1 was repeated. However, the secondary extract was contacted in a slurry tank with roasted and ground coffee representing about 40% of the charge to the fresh stage extraction column. The secondary extract in the slurry tank was held at 200° F. and the slurry was gently agitated for 15 minutes. The secondary extract was then collected by decanting the extract from the roasted and ground coffee and then collecting any additional extract from the roasted and ground coffee via centrifugation. The fresh stage extraction column was filled with 60% fresh (uncontacted) roasted and ground coffee and with 40% coffee used to contact the secondary extract in the slurry tank.

It was found that the secondary extract had increased in pH from about 4.4 to 4.9 and that the flavor was much improved, e.g., less harsh and bitter, as compared to secondary extract of Example 1. The combined extract (secondary and fresh stage) of Example 3 was considered superior to that of Examples 1 or 2.

Example 5

A percolator set consisting of 6 extraction columns connected by appropriate manifolding to permit split-extraction percolation was utilized with 3 extraction columns in the fresh stage section and 3 extraction columns in the autoclave section. Water at 200° F. was used as the fresh stage extraction liquor and water at 350° F. was used as the autoclave section extraction liquor. Three runs were made.

In run A, ordinary split-extraction percolation was run as a control. The fresh stage extract drawn off had a solids concentration of about 12% and represented a yield of about 18%. The secondary extract had a concentration of about 7% and represented a yield of about 23% for a combined yield of 41%.

In run B, the secondary extract was contacted with 30% of the roasted and ground coffee to be used as charge in the fresh stage extraction column. The extract and coffee were contacted in a slurry tank at 180° F. for about 30 minutes. The contacted coffee was then separated from the secondary extract by decantation and centrifugation and the contacted coffee was combined with uncontacted coffee and charged into a fresh stage extraction column. The fresh stage extract had a concentration of about 6% and represented a yield of about 17%. The secondary extract had a concentration of about 8% and represented a yield of about 24% for a combined yield of 41%.

The secondary extract of run B was less harsh or bitter than that from run A. This quality difference carried over to the quality of the combined extracts of run B versus run A.

In a modification of run B, the secondary extract was evaporatively concentrated to obtain a 50% solids concentration before it was combined with the fresh stage extract. This resulted in a combined extract of good quality having a concentration of about 25% solids by weight of the extract. The extract quality compared favorably to that of the unconcentrated combined extracts of run B.

The foregoing examples were for illustrative purposes only and the invention is intended to be limited only by the following claims.

What is claimed is:

1. A method of extracting roasted and ground coffee in a percolator set having from 5 to 8 extraction columns using split-extraction percolation, from 1 to 4 extraction columns containing the least extracted roasted and ground coffee being the fresh stage section of the percolator set and the remainder of the extraction columns being the autoclave section of the percolator set, a fresh stage extraction liquor being fed into the fresh stage section of the percolator set and a fresh stage extract being recovered from a fresh stage extraction column, a secondary extraction liquor being fed into the autoclave section of the percolator set and a secondary extract being recovered from the autoclave section of the percolator set comprising:

(a) filling an extraction column with roasted and ground coffee and placing said filled extraction column on stream in the percolator set as the fresh stage extraction column;

(b) filling said fresh stage extraction column with an aqueous fresh stage extraction liquor, thus contacting, wetting and extracting the roasted and ground coffee within said fresh stage extraction column; the fresh stage extraction liquor being at a temperature of from 70° F. to 210° F.;

(c) temporarily stopping the flow of extraction liquor through the fresh stage section of the percolator set, draining said fresh stage extract from the fresh stage extraction column and collecting said fresh stage extract;

(d) further extracting the partially extracted coffee solids from the fresh stage extraction column via split-extraction percolation and collecting a secondary extract.

2. The method of claim 1 wherein inert gas pressure is applied in step (d) to rapidly drain the fresh stage extract.

3. The method of claim 1 wherein the fresh stage extraction liquor is recirculated through the fresh stage extraction column prior to step (c) for up to 20 minutes.

4. The method of claim 3 wherein inert gas pressure is applied in step (d) to rapidly drain the fresh stage extract.

5. The method of claim 1 wherein the fresh stage extract and secondary extract are dried separately and the dry coffee solids are blended together.

6. The method of claim 1 wherein the fresh stage extract and secondary extract are blended and the blended extracts are dried to obtain dry coffee solids.

7. The method of claim 1 wherein the secondary extract and from 25 to 60 percent of the roasted and ground coffee to be used in the fresh stage extraction column are contacted in a vessel at a temperature of from 70° to 210° F.; the secondary extract is separated from the roasted and ground coffee and collected; and the contacted roasted and ground coffee is combined with the remainder of the fresh stage roasted and ground coffee and used to fill the extraction column in step (a).

8. The method of claim 7 wherein the vessel is an extraction column.

9. The method of claim 7 wherein the vessel is a slurry tank.

10. The method of claim 1 wherein the secondary extract is contacted in a vessel with the fresh stage roasted and ground coffee after step (d) at a temperature of from 70° F. to 210° F.; the secondary extract is separated from the roasted and ground coffee and collected; and the fresh stage roasted and ground coffee is further extracted.

11. The method of claim 10 wherein the vessel is an extraction column.

12. The method of claim 10 wherein the vessel is a slurry tank.

13. The method of claim 1 wherein the fresh stage extraction liquor is maintained in contact with the roasted and ground coffee within the filled fresh stage extraction column for a period of up to 20 minutes prior to step (c); the extraction liquor containing dissolved soluble coffee solids being the fresh stage extract.

14. The method of claim 13 wherein inert gas pressure is applied in step (c) to rapidly drain the fresh stage extract.

15. The method of claim 13 wherein the fresh stage extract and secondary extract are dried separately and the dry coffee solids are blended together.

16. The method of claim 13 wherein the fresh stage extract and secondary extract are blended and the blended extracts are dried to obtain dry coffee solids.

17. The method of claim 13 wherein the secondary extract and from 24 to 60 percent of the roasted and ground coffee to be used in the fresh stage extraction column are contacted in a vessel at a temperature of from 70° to 210° F.; the secondary extract is separated from the roasted and ground coffee and collected; and the contacted roasted and ground coffee is combined with the remainder of the fresh stage roasted and ground coffee and used to fill the extraction column in step (a).

18. The method of claim 17 wherein the vessel is an extraction column.

19. The method of claim 17 wherein the vessel is a slurry tank.

20. The method of claim 19 wherein the secondary extract is contacted in a vessel with the fresh stage roasted and ground coffee after step (c) at a temperature of from 70° F. to 210° F.; the secondary extract is separated from the roasted and ground coffee and collected; and the fresh stage roasted and ground coffee is further extracted.

21. The method of claim 20 wherein the vessel is an extraction column.

22. The method of claim 20 wherein the vessel is a slurry tank.

23. A method of extracting roasted and ground coffee in a percolator set having from 5 to 8 extraction columns using split-extraction percolation, from 1 to 4 extraction columns containing the least extracted roasted and ground coffee being the fresh stage section of the percolator set and the remainder of the extraction columns being the autoclave section of the percolator set, a fresh stage extraction liquor being fed into the fresh stage section of the percolator set and a fresh stage extract being recovered from a fresh stage extraction column, a secondary extraction liquor being fed into the autoclave section of the percolator set and a secondary extract being recovered from the autoclave section of the percolator set comprising:
 (a) drawing of a secondary extract;
 (b) contacting said secondary extract with fresh roasted and ground coffee at a temperature of from 70° F. to 210° F. in a vessel;
 (c) separating the secondary extract from the roasted and ground coffee and collecting said secondary coffee extract;
 (d) combining the contacted roasted and ground coffee with fresh uncontacted roasted and ground coffee, said combined roasted and ground coffees being used to fill a fresh stage extraction column, the contacted, roasted and ground coffee being from 25 to 60 percent of the combined roasted and ground coffee in the fresh stage extraction;
 (e) extracting the combined roasted and ground coffee in said fresh stage extraction column and drawing off and collecting fresh stage coffee extract.

24. The method of claim 23 wherein the vessel is an extraction column.

25. The method of claim 23 wherein the vessel is a slurry tank.

26. A method of extracting roasted and ground coffee in a percolator set having from 5 to 8 extraction columns using split-extraction percolation, from 1 to 4 extraction columns containing the least extracted roasted and ground coffee being the fresh stage section of the percolator set and the remainder of the extraction columns being the autoclave section of the percolator set, a fresh stage extraction liquor being fed into the fresh stage section of the percolator set and a fresh stage extract being recovered from a fresh stage extraction column, a secondary extraction liquor being fed into the autoclave section of the percolator set and a secondary extract being recovered from the autoclave section of the percolator set comprising:
 (a) filling an extraction column with roasted and ground coffee and placing said filled extraction column on stream in the percolator set as the fresh stage;
 (b) filling said fresh stage extraction column with an aqueous fresh stage extraction liquor, thus wetting and extracting the roasted and ground coffee within said fresh stage extraction column; the fresh stage extraction liquor being at a temperature of from 70° F. to 210° F.;
 (c) drawing off a predetermined quantity of fresh stage extract, temporarily stopping the flow of extraction liquor through the fresh stage section of the percolator set and draining the extraction liquor remaining in the fresh stage and combining it with the fresh stage extract draw-off;
 (d) drawing off a secondary extract;
 (e) contacting the secondary extract and the partially extracted coffee from the fresh stage extraction column in a vessel;
 (f) separating and collecting the secondary extract and continuing the split extraction processing of the partially extracted coffee.

27. The method of claim 26 wherein the vessel is an extraction column.

28. The method of claim 26 wherein the vessel is a slurry tank.

References Cited

UNITED STATES PATENTS

| | | | |
|---|---|---|---|
| 3,458,320 | 7/1969 | Niven, Jr., | 99—71 |
| 3,656,964 | 4/1972 | Mansky et al. | 99—71 |
| 3,655,399 | 4/1972 | Pitchon et al. | 99—71 |
| 2,949,364 | 8/1960 | Bilenker | 99—71 |
| 3,007,797 | 11/1961 | Tiktak et al. | 99—71 |

FRANK W. LUTTER, Primary Examiner
W. L. MENTLIK, Assistant Examiner

U.S. Cl. X.R.

426—471